United States Patent
Sarangdhar et al.

(10) Patent No.: US 8,954,747 B2
(45) Date of Patent: Feb. 10, 2015

(54) PROTECTING KEYSTROKES RECEIVED FROM A KEYBOARD IN A PLATFORM CONTAINING EMBEDDED CONTROLLERS

(75) Inventors: Nitin V. Sarangdhar, Portland, OR (US); Jasmeet Chhabra, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 119 days.

(21) Appl. No.: 13/174,857

(22) Filed: Jul. 1, 2011

(65) Prior Publication Data
US 2013/0007466 A1    Jan. 3, 2013

(51) Int. Cl.
*G06F 11/30*    (2006.01)
*G06F 21/83*    (2013.01)

(52) U.S. Cl.
CPC ........................... *G06F 21/83* (2013.01)
USPC .................. 713/189; 713/2; 713/300; 726/17; 709/238

(58) Field of Classification Search
CPC .......... H04L 9/0618; H04L 9/38; G06F 21/83
USPC ............. 713/187–189, 192–193, 2, 151, 184, 713/176, 154; 726/23–24, 17; 705/51
See application file for complete search history.

(56) References Cited

U.S. PATENT DOCUMENTS

| | | | |
|---|---|---|---|
| 6,442,692 B1 * | 8/2002 | Zilberman | 713/184 |
| 7,145,481 B2 * | 12/2006 | Cooper | 341/26 |
| 7,774,595 B2 * | 8/2010 | Chung Geon et al. | 713/154 |
| 7,784,088 B2 * | 8/2010 | Darbha et al. | 726/4 |
| 7,853,533 B2 * | 12/2010 | Eisen | 705/64 |
| 8,347,398 B1 * | 1/2013 | Weber | 726/26 |
| 8,406,421 B2 * | 3/2013 | Kamen et al. | 380/28 |
| 8,621,620 B2 * | 12/2013 | Sallam | 726/22 |
| 8,712,050 B2 * | 4/2014 | Delia et al. | 380/255 |
| 8,813,227 B2 * | 8/2014 | Sallam | 726/24 |
| 8,832,778 B2 * | 9/2014 | McCune et al. | 726/1 |

(Continued)

FOREIGN PATENT DOCUMENTS

| WO | 2012045153 A1 | 4/2012 |
|---|---|---|
| WO | 2013006510 A1 | 1/2013 |

OTHER PUBLICATIONS

Guillaume Duc, Improving Virus protection with an efficient secure architecture with memory encryption, May 2008, vol. 4, pp. 101-113.*

(Continued)

*Primary Examiner* — Dede Zecher
*Assistant Examiner* — Viral Lakhia
(74) *Attorney, Agent, or Firm* — Jordan IP Law, LLC

(57) ABSTRACT

Systems and methods of managing keystroke data in embedded keyboard environments may involve transferring a mode request from a management controller to an embedded controller of a keyboard via a dedicated communication channel. Keystroke activity can be detected at the keyboard, and keystroke data may be transferred from the embedded controller to the management controller via the dedicated communication channel in response to the keystroke activity and the mode request. In addition, the management controller may be used to encrypt the keystroke data, wherein the encrypted keystroke data can be transmitted from the management controller to an off-platform service via a network controller.

26 Claims, 3 Drawing Sheets

(56) References Cited

U.S. PATENT DOCUMENTS

| | | | |
|---|---|---|---|
| 2004/0034788 A1* | 2/2004 | Ross | 713/193 |
| 2004/0230805 A1* | 11/2004 | Peinado et al. | 713/181 |
| 2005/0068203 A1* | 3/2005 | Cooper | 341/26 |
| 2006/0036731 A1* | 2/2006 | Mossman et al. | 709/225 |
| 2006/0123056 A1 | 6/2006 | Darbha et al. | |
| 2007/0143593 A1 | 6/2007 | Cardoso | |
| 2007/0182714 A1 | 8/2007 | Pemmaraju | |
| 2009/0070595 A1* | 3/2009 | Delia et al. | 713/189 |
| 2009/0144558 A1* | 6/2009 | Wang | 713/189 |
| 2009/0172823 A1* | 7/2009 | Maor | 726/29 |
| 2010/0195825 A1 | 8/2010 | Cini | |
| 2010/0228994 A1* | 9/2010 | Kang | 713/189 |
| 2011/0167496 A1* | 7/2011 | McPhail et al. | 726/24 |
| 2012/0255010 A1* | 10/2012 | Sallam | 726/24 |
| 2012/0324242 A1* | 12/2012 | Kirsch | 713/189 |

OTHER PUBLICATIONS

International Search Report and Written Opinion received for PCT application No. PCT/US2012/045153, mailed on Oct. 29, 2012, 10 pages.

International Preliminary Report on Patentability and Written Opinion received for International Application No. PCT/US2012/045153, mailed on Jan. 16, 2014, 7 pages.

\* cited by examiner

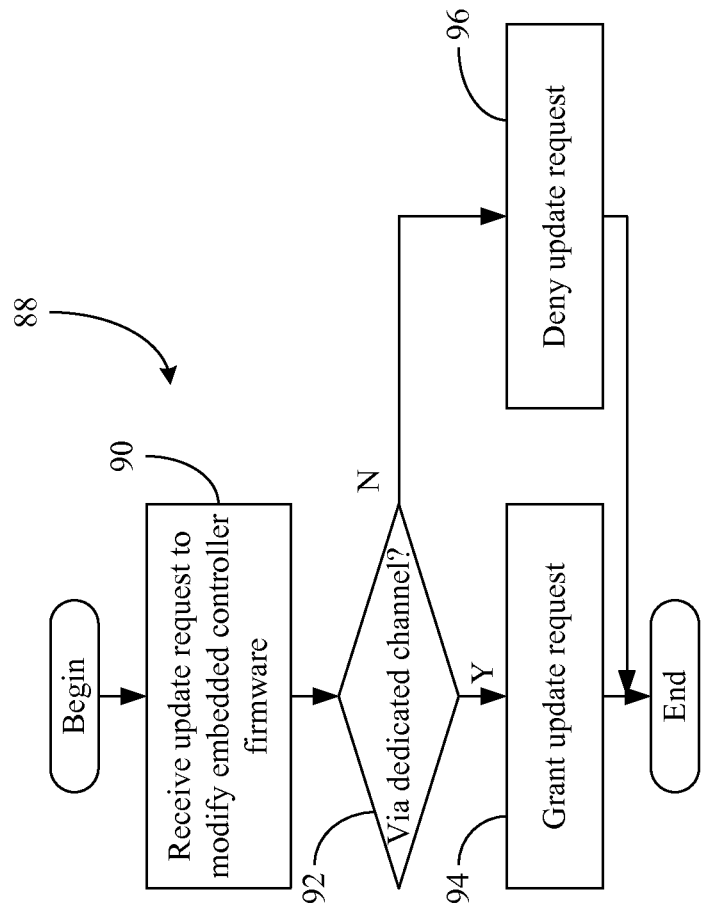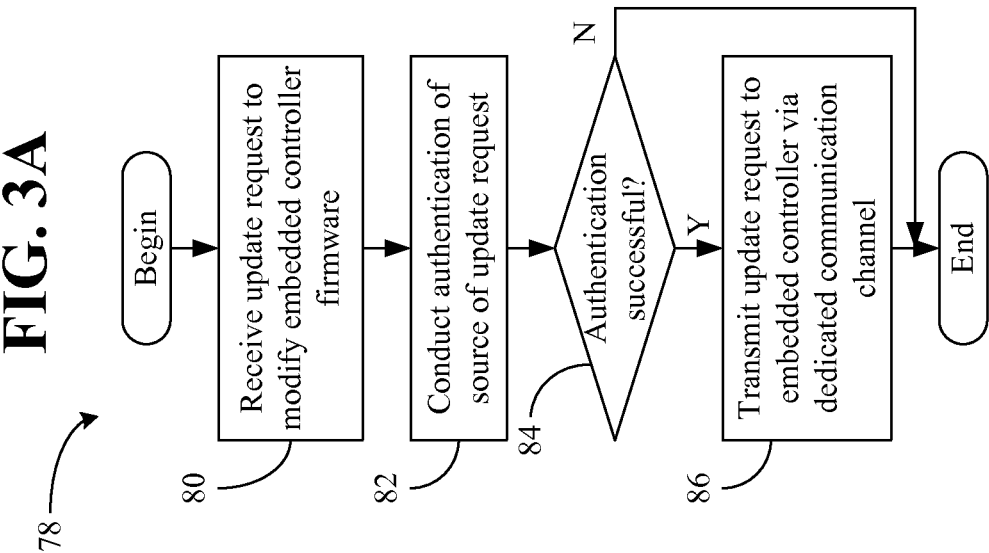

PROTECTING KEYSTROKES RECEIVED FROM A KEYBOARD IN A PLATFORM CONTAINING EMBEDDED CONTROLLERS

BACKGROUND

1. Technical Field

Embodiments generally relate to the management of keystroke data in embedded keyboard environments. More particularly, embodiments relate to the prevention of malware access to keystroke data and the enablement of keyboard functionality in platforms lacking an operable or less secure host operating system (OS).

2. Discussion

In less secure computing systems, malware may be used to attack keystrokes received from keyboards. For example, "traditional key-logger" attacks have been known to be launched in operating system drivers, resulting in the loss of passwords, credit card information, etc., received from the keyboard. In addition, "key injector" attacks may result in the creation of false human presence indications to the server receiving the keystrokes, also potentially leading to substantial security concerns. Other keyboard-related issues may involve manageability applications such as remote keyboard-video-mouse (KVM) control applications and "hot key" applications that may require secure keyboard input from a user even when the host operating system (OS) is inoperable and the host OS stack normally used to communicate with the keyboard is unavailable.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 3A and 3B are flowchart of examples of methods of managing embedded controller firmware updates according to an embodiment.

DETAILED DESCRIPTION

Figure 1:
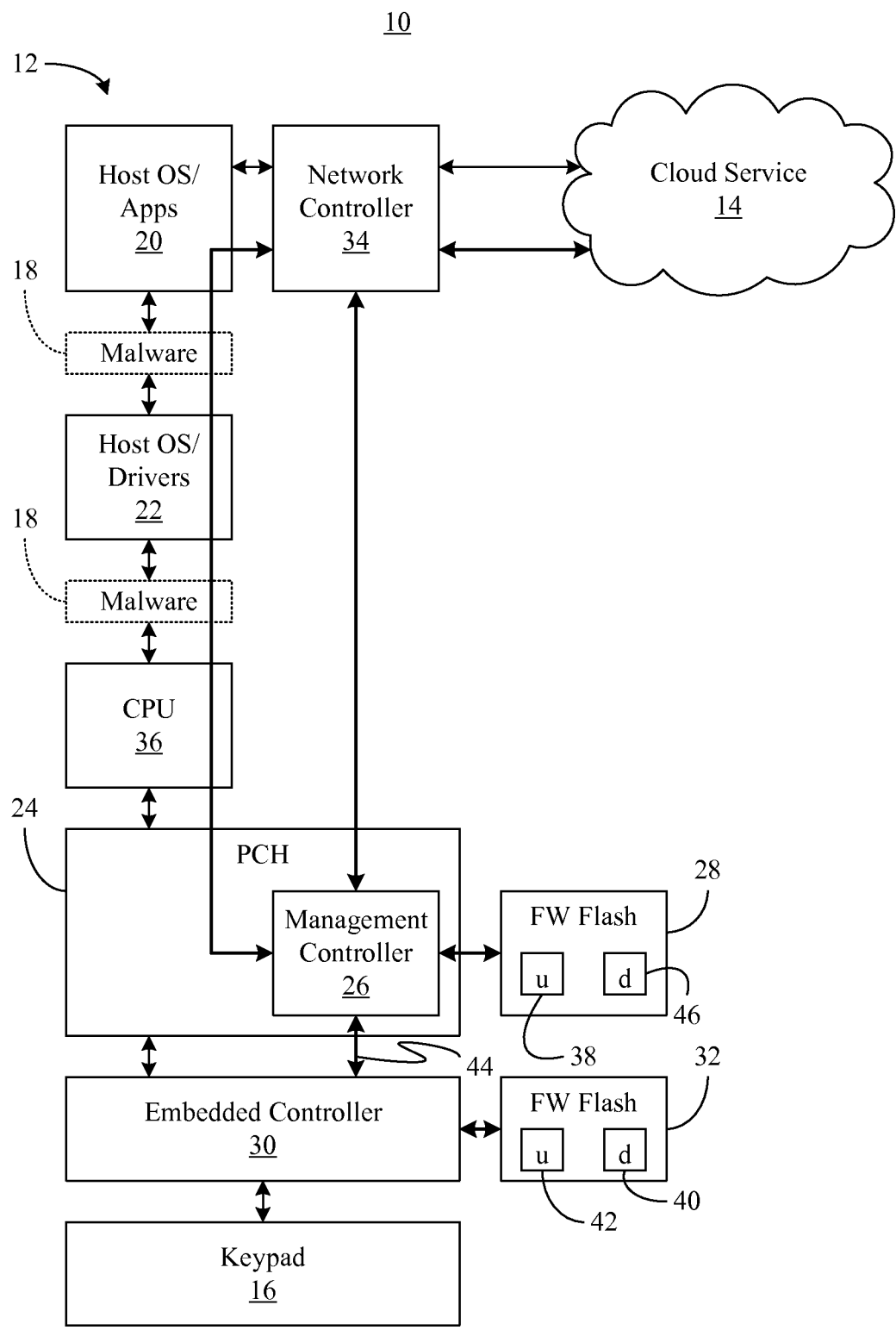
FIG. 1 is a block diagram of an example of a computing architecture according to an embodiment.

Embodiments may include a computing platform having a keyboard, a network controller, an embedded controller with first logic, and a management controller with second logic. The first logic of the embedded controller may be configured to receive a mode request via a dedicated sideband communication channel. The first logic can also detect keystroke activity at the keyboard and transmit keystroke data via the dedicated sideband communication channel if the mode request corresponds to a secure mode, wherein the keystroke data is to correspond to the keystroke activity. The second logic of the management controller may be configured to transmit the mode request to the embedded controller, and to receive the keystroke data in secure or attestation mode. In secure mode, the data may be no longer sent to the operating system. In attestation mode, the data may be sent to both the second logic and the operating system. The second logic can also transmit encrypted keystroke data to an off-platform service via the network controller or consume them locally on the platform.

Embodiments may also include a computer readable persistent storage medium having a set of embedded controller firmware instructions which, if executed by an embedded controller, cause the embedded controller to receive a mode request from a management controller via a dedicated communication channel. The firmware instructions can also cause the embedded controller to detect keystroke activity at a keyboard and transmit keystroke data to the management controller via the dedicated communication channel if the mode request corresponds to a secure mode, wherein the keystroke data is to correspond to the keystroke activity. The firmware instructions may also cause the management controller to transmit encrypted keystroke data to an off-platform service.

Other embodiments can include a computer readable storage medium having a set of management controller firmware instructions which, if executed by a management controller, cause the management controller to receive keystroke data from an embedded controller via a dedicated communication channel, and simultaneously issue he keystroke data to the operating system. The firmware instructions may also cause the management controller to transmit encrypted keystroke data to an off-platform service.

In addition, embodiments may involve a computer implemented method in which a mode request is transferred from a management controller to an embedded controller via a dedicated communication channel, wherein the mode request corresponds to at least one of a secure mode and an attestation input mode. Keystroke activity can be detected at a keyboard coupled to the embedded controller, wherein keystroke data is transferred from the embedded controller to the management controller via the dedicated communication channel in response to the keystroke activity and the mode request. The management controller may be used to encrypt the keystroke data, and the encrypted keystroke data can be transmitted from the management controller to an off-platform service via a network controller.

Turning now to FIG. 1, a computing architecture 10 is shown in which a user of a computing platform 12 having a hardware embedded keypad 16 interacts with an off-platform service such as a cloud service 14. In particular, the computing platform 12 may be part of a mobile platform such as a laptop, personal digital assistant (PDA), wireless smart phone, media player, imaging device, mobile Internet device (MID), any smart device such as a smart phone, smart tablet, smart TV and so forth, or any combination thereof. The computing platform 12 may also be part of a fixed platform such as a personal computer (PC), server, workstation, etc.

The cloud service 14 may include one or more e-commerce (electronic commerce) and/or manageability servers that may reside on the global Internet, a corporate intranet, a home intranet, etc. Thus, to the extent that the cloud service 14 includes e-commerce functionality, the illustrated architecture 10 could involve the transfer of sensitive information such as passwords and credit card information from the keypad 16 to the cloud service 14 in order to complete purchases, view account information, and so forth. As will be discussed in greater detail, the information entered via the keypad 16 may be secured from unauthorized access by virus software such as malware 18, which could include malicious software that logs the keystrokes typed by the user of the keypad 16. In addition, the computing platform 12 may provide the cloud service 14 with an attestation/verification that information received from the computing platform 12 originated from the user of the platform 12 rather than the malware 18, which could also include virus software masquerading as a human (e.g., key injector malware).

To the extent that the cloud service 14 includes manageability functionality, the illustrated architecture 10 may involve the remote access and/or control of the computing platform 12 to troubleshoot problems regarding the computing platform 12 and conduct other activities. In such a usage model, a user of the illustrated computing platform 12 is able to enter secure information such as account identifiers, user identifiers, user consent, etc., via the keypad 16 even in situations when host operating system (OS) software of the computing platform 12 such as host OS/applications (e.g., Internet browser, email, etc.) 20 and/or host OS/drivers 22 are inoperable.

In particular, the illustrated computing platform 12 includes a network controller 34, a central processing unit (CPU) 36, and a platform controller hub (PCH) 24 having a secure management controller 26 with associated firmware (FW) stored in, for example, flash memory 28. The illustrated management controller 26 operates inside a secure environment and may use memories that are not easily accessed, such as on-package static random access memory (SRAM) or off-package uniform memory access (UMA) memory, to conduct secure operations. In addition, the computing platform 12 may include an embedded controller 30 having associated firmware stored in flash memory 32.

As will be discussed in greater detail below, the management controller 26 and embedded controller 30 may communicate with one another over a dedicated communication channel 44 such as a System Management Bus (SMBus Specification, SBS Implementers Forum, Ver. 2.0, Aug. 3, 2000, etc.) in order to protect keystroke activity at the keypad 16 from being captured and/or spoofed by malware 18. In particular, the illustrated FW flash memory 32 of the embedded controller 30 includes downstream logic ("d") 40 to detect keystroke activity at the keypad 16, and upstream logic ("u") 42 to process keystroke data associated with the keystroke activity for transmission to the management controller 26 over the dedicated communication channel 44 and/or to the host OS via the unsecure portion of the PCH 24 and the CPU 36.

In addition, the illustrated management controller FW flash memory 28 includes downstream logic ("d") 46 to interface with the upstream logic 42 of the embedded controller 30 over the dedicated communication channel 44. In one example, the management controller downstream logic 46 and embedded controller upstream logic 42 use a protocol such as the Manageability Transport Communication Protocol (MCTP Base Specification, Distributed Management Task Force, Version 1.0.0, Jul. 28, 2009) to communicate relevant keystroke information over the dedicated communication channel 44. The management controller FW flash memory 28 may also include upstream logic ("u") 38 to encrypt keystroke data and interface either directly (e.g., using a local network stack) or indirectly with the network controller 34 in the transmission of the encrypted keystroke data to the cloud service 14. In one example, the management controller 26 and cloud service 14 use a standard public key infrastructure (PKI) based asymmetric key exchange protocol to communicate with one another. The management controller upstream logic 38 can also include a network stack capable of communicating with the network controller 34 without any assistance from the host OS components.

The network controller 34 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The network controller 34 might also use a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., to enable access to additional off-platform services/resources. By selectively routing keystroke data through the secure management controller 26, the illustrated approach provides a heightened level of protection for keystroke data.

Figure 2:
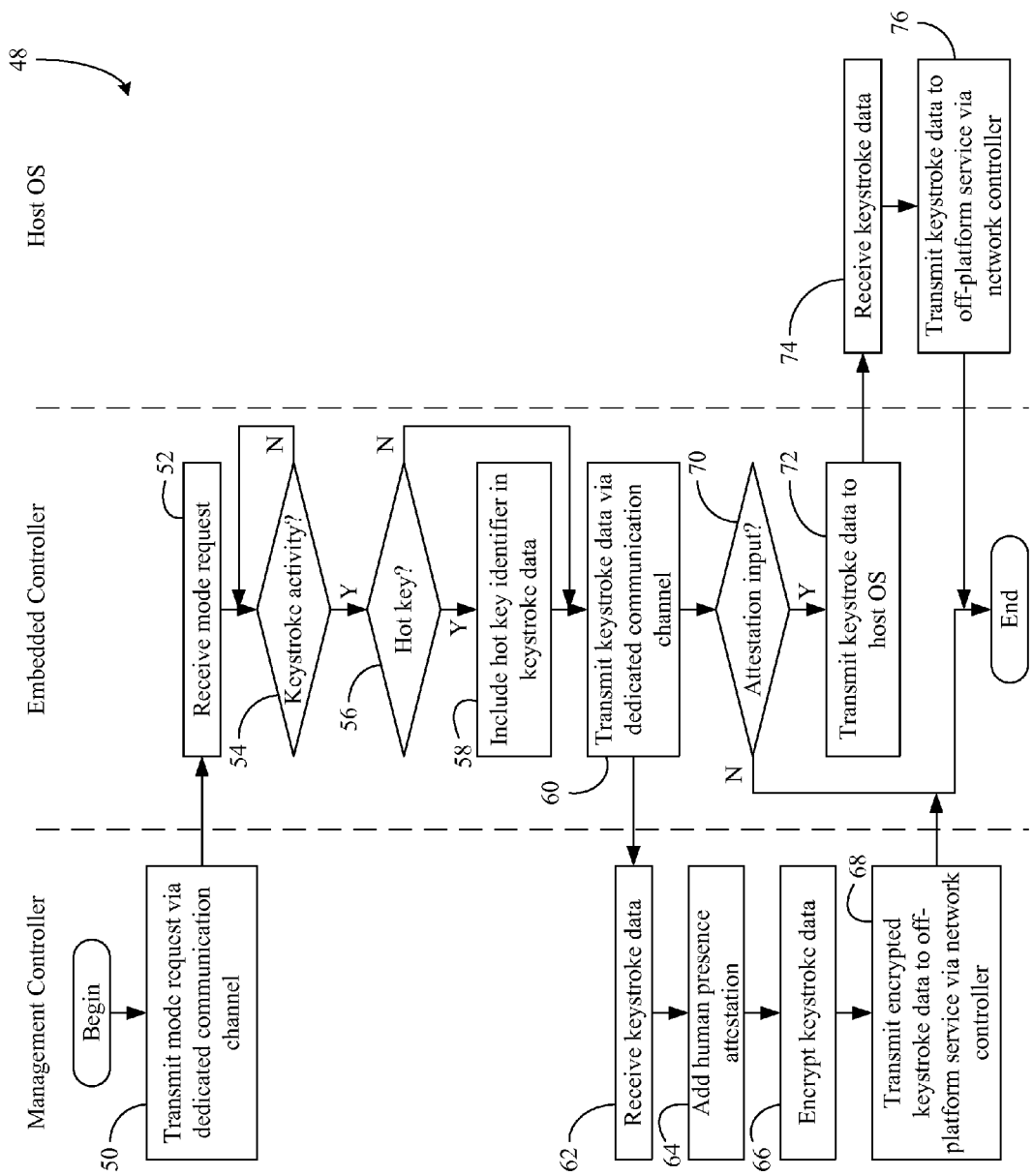
FIG. 2 is a flowchart of an example of a method of managing keystroke activity according to an embodiment.

FIG. 2 shows a method 48 of managing keystroke activity. The method 48 may be implemented in a computing platform as a set of executable logic instructions stored in a machine- or computer-readable storage medium such as random access memory (RAM), read only memory (ROM), programmable ROM (PROM), flash memory, firmware, microcode, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 48 may be written in any combination of one or more programming languages, including an object oriented programming language such as C++ or the like and conventional procedural programming languages, such as the "C" programming language or similar programming languages. Moreover, various aspects of the method 48 could be implemented as embedded and/or programmable logic of a graphics processor using any of the aforementioned circuit technologies.

Management controller processing block 50 provides for transmitting a mode request to an embedded controller of a keyboard via a dedicated communication channel. The dedicated communication channel could be a SMBus channel or other virtual communication channel over a different physical implementation. In one example, the mode request may correspond to a secure mode in which the embedded controller is instructed to send keystroke data only to the management controller. The mode request may also correspond to an attestation input mode in which the embedded controller is instructed to send keystroke data to both the management controller and a host OS of the computing platform. In the attestation input mode example, an on-platform or off-platform service might compare the keystroke data received via the two paths to determine if the keystroke data has been altered/spoofed by malware such as key injector malware. Simply put, if the keystroke data received via the two paths matches, an off-platform service such as the off-platform service 14 (FIG. 1) might determine that a human is present at the keyboard. Accordingly, the attestation input mode can enable the management controller to effectively function as an independent verification body.

Additionally, the generation of the mode request may be in response to a determination that the host OS of the computing platform is inoperable. In such a case, a user of the computing system may still be able to interact with remote personnel (e.g., technical service personnel) in order to troubleshoot/repair the host OS. Indeed, the remote personnel may be able to place the computing system in a keyboard-video-mouse (KVM) mode upon receipt of the user's authorization, which can be entered via the keyboard while the host OS of the computing platform is inoperable. The KVM mode of operation may therefore enable the remote personnel to use remote input/output (JO) devices (e.g., remote keyboard, monitor/video, mouse) to control the computing platform in question.

Upon receipt of the mode request at embedded controller block 52, the embedded controller can determine at block 54 whether keystroke activity has been detected. As already noted, the keystroke activity might include an entry of sensitive data such as a password or credit card information, a KVM consent response, a "hot key" (e.g., predefined help request key sequence), chat dialog content, and so forth. If keystroke activity is detected, illustrated embedded controller block 56 determines whether a hot key sequence has been entered and, if so, illustrated embedded controller block 58 includes an identifier of the hot key sequence (e.g., "help requested" identifier) in keystroke data associated with the keystroke activity. Alternatively, the hot key determination process may be shifted to the management controller, wherein the embedded controller may transfer the raw keystrokes to the management controller.

Embedded controller block 60 may transmit the keystroke data associated with the keyboard activity to the management controller via the dedicated communication channel. Illustrated management controller block 62 receives the keystroke data, and management controller block 64 may add a human presence attestation to the keystroke data. Alternatively, the human presence could be inferred by the on-platform or off-platform service provided that the management controller supplies the appropriate security credentials (e.g., digital signature/certificate) to the off-platform service. The keystroke data may be encrypted (e.g., with an appropriate private encryption key) at management controller block 66, wherein illustrated management controller block 68 transmits the encrypted keystroke data to the off-platform service via a network controller such as network controller 34 (FIG. 1). In particular, the encrypted keystroke data could be transmitted indirectly to the network controller through the host OS components if the host OS is operable, or directly to the network controller using a network stack associated with the management controller (e.g., running inside the management controller firmware) if, for example, the host OS is inoperable or otherwise untrustworthy.

The embedded controller may also determine at block 70 whether the mode request corresponds to an attestation input mode. If so, illustrated embedded controller block 72 provides for transmitting the keystroke data to the host OS of the computing platform. Upon receipt of the keystroke data at host OS block 74, the host OS may transmit the keystroke data to the off-platform service via the network controller at block 76.

FIG. 3A shows a method 78 of managing an embedded controller firmware update from the perspective of a management controller such as management controller 26 (FIG. 1). Thus, the method 78 may be implemented in a computing platform as a set of executable management controller logic instructions stored in a machine- or computer-readable storage medium such as, for example, RAM, ROM, PROM, flash memory, firmware, microcode, etc., in fixed-functionality hardware using circuit technology such as, for example, ASIC, CMOS or TTL technology, or any combination thereof.

In general, the illustrated method 78 may be used to protect a computing system from attacks on the keyboard embedded controller firmware itself. More particularly, the illustrated approach requires embedded controller firmware modifications to be requested through the dedicated communication channel between the embedded controller and the management controller, which is able to verify update requests. For example, processing block 80 may receive an update request to modify embedded controller firmware instructions, and block 82 may conduct an authentication of the source of the update request. Thus, the illustrated approach might involve receiving a signed image from an off-platform service such as the cloud service 14 (FIG. 1), and verifying that the image originated from a valid source. If it is determined at block 84 that the authentication has been successful, block 86 can transmit the update request to the embedded controller via the dedicated communication channel.

FIG. 3B shows a method 88 of managing an embedded controller firmware update from the perspective of an embedded controller such as the embedded controller 30 (FIG. 1). Thus, the method 88 may be implemented in a computing platform as a set of executable embedded controller logic instructions stored in a machine- or computer-readable storage medium such as, for example, RAM, ROM, PROM, flash memory, firmware, microcode, etc., in fixed-functionality hardware using circuit technology such as, for example, ASIC, CMOS or TTL technology, or any combination thereof.

Processing block 90 provides for receiving an update request to modify embedded controller firmware instructions. If it is determined at block 92 that the update request was received via a dedicated communication channel with a secure management controller, block 94 may provide for granting the update request. If the update request was not received via the dedicated communication channel, illustrated block 96 denies the update request. Thus, the illustrated approach enables the embedded controller firmware to be "hardened" in the sense that modifications of the firmware can be better protected from malware attacks.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
    transferring a mode request from a management controller to an embedded controller that is integrated into a computing platform, via a dedicated communication channel, wherein the mode request corresponds to at least one of a secure mode and an attestation input mode;
    detecting keystroke activity at an embedded keyboard of the computing platform, wherein the embedded keyboard is coupled to the embedded controller;
    transferring keystroke data from the embedded controller to the management controller via the dedicated communication channel in response to the keystroke activity and the mode request;
    using the management controller to encrypt the keystroke data; and
    transmitting the encrypted keystroke data from the management controller to an off-platform service via a network controller.

2. The method of claim 1, wherein the mode request corresponds to the attestation input mode and the method further includes:
    transferring the keystroke data from the embedded controller to a host operating system; and
    transmitting the keystroke data from the host operating system to the off-platform service via the network controller.

3. The method of claim 1, further including detecting an inoperability of a host operating system, wherein the mode request is transferred to the embedded controller in response to detecting the inoperability of the host operating system.

4. The method of claim 1, further including:
    receiving an update request to modify firmware associated with the embedded controller;
    using the management controller to authenticate a source of the update request;
    transferring the update request to the embedded controller via the dedicated communication channel if the authentication is successful;
    granting the update request if the embedded controller receives the update request via the dedicated communication channel;
    denying the update request if the embedded controller does not receive the update request via the dedicated communication channel.

5. The method of claim 1, further including transferring the encrypted keystroke data from the management controller to the network controller via at least one of a network stack associated with the management controller and a host operating system associated with the computing platform.

6. The method of claim 1, further including adding a human presence attestation to the encrypted keystroke data.

7. A non-transitory computer readable storage medium comprising a set of embedded controller firmware instructions which, if executed by an embedded controller that is integrated into a computing platform, cause the embedded controller to:
    receive a mode request from a management controller via a dedicated communication channel, wherein the mode request corresponds to at least one of a secure mode and an attestation input mode;
    detect keystroke activity at an embedded keyboard of the computing platform, wherein the embedded keyboard is coupled to the embedded controller;
    transmit keystroke data to the management controller via the dedicated communication channel if the mode request corresponds to a secure mode, wherein the keystroke data corresponds to the keystroke activity, and the keystroke data is encrypted using the management controller;
    receive an update request to modify the firmware instructions;
        grant the update request if the update request is received via the dedicated communication channel; and
        deny the update request if the update request is not received via the dedicated communication channel.

8. The medium of claim 7, wherein the firmware instructions, if executed, cause the embedded controller to:
    transmit the keystroke data to the management controller via the dedicated communication channel if the mode request corresponds to an attestation input mode; and
    transmit the keystroke data to a host operating system if the mode request corresponds to the attestation input mode.

9. The medium of claim 7, wherein the mode request is to be associated with an inoperability of a host operating system.

10. The medium of claim 7, wherein the keystroke activity is to be associated with a remote keyboard-video-mouse consent response.

11. The medium of claim 7, wherein the firmware instructions, if executed, cause a computer to identify a hot key input based on the keystroke activity, wherein the keystroke data is to include an identifier of the hot key input.

12. A non-transitory computer readable storage medium comprising a set of management controller firmware instructions which, if executed by a management controller, cause the management controller to:
    transmit a mode request to an embedded controller via a dedicated communication channel, wherein the mode request instructs the embedded controller to transmit keystroke data to the management controller;
    receive keystroke data from an embedded controller that is integrated into a computing platform, via a dedicated communication channel;
    encrypt the keystroke data;
    transmit the encrypted keystroke data to an off-platform service via a network controller, wherein the encrypted keystroke data is sent to the off-platform service via a network stack associated with the management controller, and wherein the encrypted keystroke data bypasses a host operating system;
    receive an update request to modify embedded controller firmware instructions;

conduct an authentication a source of the update request; and transmit the update request to the embedded controller via the dedicated communication channel if the authentication is successful.

13. The medium of claim 12, wherein the mode request is to correspond to an attestation input mode, instruct the embedded controller to transmit the keystroke data to the management controller, and instruct the embedded controller to transmit the keystroke data to a host operating system.

14. The medium of claim 12, wherein the management controller firmware instructions, if executed, cause the management controller to:

detect an inoperability of a host operating system; and transmit the mode request to the embedded controller in response to detecting the inoperability of the host operating system.

15. The medium of claim 12, wherein the keystroke data is to be associated with at least one of a keyboard-video-mouse consent response and a hot key input.

16. The medium of claim 12, wherein the encrypted keystroke data is to be sent to the off-platform service via a network stack associated with the management controller, and wherein the encrypted keystroke data is to bypass a host operating system.

17. The medium of claim 12, wherein the encrypted keystroke data is to be sent to the off-platform service via a host operating system.

18. The medium of claim 12, wherein the management controller firmware instructions, if executed, are to cause the management controller to add a human presence attestation to the encrypted keystroke data.

19. A computing platform comprising:

an embedded keyboard;

a network controller;

an embedded controller including first logic to,
  receive a mode request via a dedicated communication channel,
  detect keystroke activity at the embedded keyboard, and
  transmit keystroke data via the dedicated communication channel if the mode request corresponds to a secure mode, wherein the keystroke data is to correspond to the keystroke activity,
  receive an update request to modify the first logic,
  grant the update request if the update request is received via the dedicated communication channel, and
  deny the update request if the update request is not received via the dedicated communication channel;

and a management controller including second logic to,
  transmit the mode request to the embedded controller,
  receive the keystroke data,
  encrypt the keystroke data, and
  transmit the encrypted keystroke data to an off-platform service via the network controller.

20. The computing platform of claim 19, further including a chipset having third logic to execute a host operating system, wherein the first logic is to, transmit the keystroke data to the management controller via the dedicated communication channel if the mode request corresponds to an attestation input mode, and transmit the keystroke data to the host operating system if the mode request corresponds to the attestation input mode.

21. The computing platform of claim 19, wherein the second logic is to, detect an inoperability of a host operating system associated with the computing platform, and transmit the mode request to the embedded controller in response to detecting the inoperability of the host operating system.

22. The computing platform of claim 19, wherein the keystroke data is to be associated with at least one of a keyboard-video-mouse consent response and a hot key input.

23. The computing platform of claim 19, wherein the second logic is to, receive an update request to modify the first logic, conduct an authentication of a source of the update request, and transmit the update request to the embedded controller via the dedicated communication channel if the authentication is successful.

24. The computing platform of claim 19, wherein the encrypted keystroke data is to be sent to the off-platform service via a network stack associated with the management controller, and wherein the encrypted keystroke data is to bypass a host operating system associated with the computing platform.

25. The computing platform of claim 19, wherein the encrypted keystroke data is to be sent to the off-platform service via a host operating system associated with the computing platform.

26. The computing platform of claim 19, wherein the second logic is to add a human presence attestation to the encrypted keystroke data.

* * * * *